United States Patent
Martens et al.

(10) Patent No.: US 10,257,982 B2
(45) Date of Patent: Apr. 16, 2019

(54) WEAR-INHIBITING CLIP FOR DRAPER CLEAT OR SLAT OF A CROP HARVESTING HEADER

(71) Applicant: MacDon Industries Ltd., Winnipeg (CA)

(72) Inventors: Kris Martens, Winnipeg (CA); Ryan Georgison, Winnipeg (CA); Doug Rogalsky, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 15/631,198

(22) Filed: Jun. 23, 2017

(65) Prior Publication Data

US 2018/0368323 A1   Dec. 27, 2018

(51) Int. Cl.
| | | |
|---|---|---|
| A01D 75/00 | (2006.01) | |
| A01D 61/02 | (2006.01) | |
| A01D 34/14 | (2006.01) | |
| B65G 15/42 | (2006.01) | |

(52) U.S. Cl.
CPC ............. *A01D 75/00* (2013.01); *A01D 61/02* (2013.01); *A01D 34/14* (2013.01); *B65G 15/42* (2013.01)

(58) Field of Classification Search
CPC ...... A01D 57/20; A01D 61/02; A01D 61/002; A01D 41/14; A01D 43/06; A01D 57/06; A01D 75/00; A01D 34/14; B65G 15/42; B65G 15/30; B65G 15/52; A01F 15/18; A01F 2015/186
See application file for complete search history.

(56) References Cited

U.S. PATENT DOCUMENTS

| | | |
|---|---|---|
| 434,565 A | 8/1890 | Nelson |
| 631,526 A | 8/1899 | Luckehe |
| 664,054 A | 12/1900 | Luckehe |
| 808,916 A | 1/1906 | Gordon |
| 2,137,713 A | 3/1937 | Conner |
| 2,305,044 A | 12/1942 | Toews et al. |
| 2,875,887 A * | 3/1959 | Hinchcliffe ............ B65G 15/42  198/699 |
| 3,515,013 A | 6/1970 | Wykes |
| 4,316,536 A * | 2/1982 | Verbeek ................. A01D 61/02  198/699 |

(Continued)

FOREIGN PATENT DOCUMENTS

| | | | |
|---|---|---|---|
| CN | 205855764 | 1/2017 | |
| EP | 2345321 A2 * | 7/2011 | ............. A01D 57/20 |

(Continued)

*Primary Examiner* — Arpad Fabian-Kovacs
(74) *Attorney, Agent, or Firm* — Ryan W. Dupuis; Ade & Company Inc.; Adrian D. Battison

(57) ABSTRACT

A clip for a draper of a crop header is arranged to cover a portion of a cleat of a draper where the lower run of the draper comes into contact with a lower support track which confines the lower run to a location clear of the cutter bar and a forwardly extending beam of the crop header frame. The clip forms a channel which features teeth presented at an inside of the channel for biting into the cleat so as to retain the clip thereon with the teeth forming ramped surfaces which can slide along the cleat upon installation of the clip, for example by press fitting the clip downwardly onto the cleat.

20 Claims, 7 Drawing Sheets

(56) References Cited

U.S. PATENT DOCUMENTS

| | | | | |
|---|---|---|---|---|
| 4,553,663 | A * | 11/1985 | Johnson | A01D 61/02 198/465.1 |
| 6,321,904 | B1 * | 11/2001 | Mitchell | B65G 15/42 198/690.2 |
| 7,472,533 | B2 * | 1/2009 | Talbot | A01D 57/20 56/181 |
| 7,802,417 | B2 * | 9/2010 | Sauerwein | A01D 41/14 56/181 |
| 8,281,561 | B2 * | 10/2012 | Dow | A01D 57/20 56/181 |
| 8,402,728 | B2 * | 3/2013 | Kidd | B65G 15/30 198/844.1 |
| 8,484,938 | B2 * | 7/2013 | Cormier | A01D 61/006 56/181 |
| 9,622,412 | B2 * | 4/2017 | Hasenour | A01D 57/20 |
| 2008/0276591 | A1 * | 11/2008 | Tippery | A01D 57/06 56/181 |

FOREIGN PATENT DOCUMENTS

| | | |
|---|---|---|
| EP | 2896283 A2 | 7/2015 |
| EP | 2896283 A3 | 7/2015 |
| WO | WO 2014019681 A1 * | 2/2014 ............ A01D 57/20 |

\* cited by examiner

WEAR-INHIBITING CLIP FOR DRAPER CLEAT OR SLAT OF A CROP HARVESTING HEADER

FIELD OF THE INVENTION

This invention relates to a draper assembly for a crop header and particularly to a device for reducing wear experienced by draper cleats or slats during operation of the draper assembly.

BACKGROUND

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper forming a continuous loop of flexible material wrapped around the rollers so as to define a front edge of the draper adjacent the cutter bar, a rear edge of the draper spaced rearwardly of the cutter bar, an upper run of the draper on top of the roller and a lower run of the draper below the rollers. The cut crop thus falls rearwardly onto the upper run of the draper and is transported longitudinally of the header. Conventionally, between the two end draper rollers there is provided a support plate assembly for supporting the upper run of the draper to prevent sagging. There is also provided a lower support track in the form of a plate extending longitudinally and rearwardly of the cutter bar beneath the lower run of the draper to confine the lower run of the belt to a location above a respective forwardly extending beam over which the lower run is passing and above a bottom of the cutter bar. In short, the lower support track confines the lower run to a location clear of the header frame and of the cutter bar so that the lower run does not contact either.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper normally comprises a fabric which is coated with a rubber material which is then vulcanized after forming of the fabric into the required shape and after attachment thereto of transverse slats or cleats. Typically, this rubber material is particularly designed to optimize traction with the draper guide rollers so as to minimize slippage between the fabric and the draper guide rollers as at least one of these guide rollers is driven so as to effect movement of the fabric.

As such, this rubber material is also at the cleats which come into contact with the lower support track at the lower return run of the draper. One problem which arises from this combination of lower support track and draper is that of friction at an interface between the cleat, which presents a surface spaced away from an outer surface of the fabric, and the lower support track which is typically stationary relative to the lower run of the draper moving thereover in direct contact with the lower support track. This friction causes the draper to wear at the cleats.

This undesirable wear on the draper is dependent on factors including force, speed of the draper passing past the lower support track, and friction at the lower support track and at the draper. The force and speed cannot be modified due to specifications for the header, leaving friction as the factor to be modified. Reducing the coefficient of friction of the track has a limited effect on the friction which is generated at this interface as, of the two components, it is the rubber which has the higher coefficient of friction.

SUMMARY OF THE INVENTION

According to one aspect of the present invention there is provided a clip for use in a crop header which includes a draper with (i) a continuous belt of flexible material arranged to define an upper run and a lower run and having an outer surface of the belt for carrying cut crop thereon, and (ii) a plurality of cleats supported on the belt each having a top surface spaced from the outer surface of the belt and side surfaces depending from the top surface to the outer surface of the belt, the clip comprising:

a channel having a crown extending longitudinally between first and second ends at a top side of the channel that is locatable at or adjacent the top surface of the respective cleat and legs depending downwardly from opposing sides of the crown; and a plurality of teeth supported on the legs at a location spaced downwardly from the crown and extending inwardly towards an opposite one of the legs to respective inner free ends of the teeth which are adapted for biting into the side surfaces of the respective cleat to retain the clip on the respective cleat in a mounted position of the clip;

each tooth having a ramped surface opposite from the crown which extends inwardly towards the opposite one of the legs at an upward slope towards the crown up to the inner free end of the respective tooth such that the ramped surface of each tooth is adapted to ride along the side surfaces of the respective cleat as the clip is pressed downwardly onto the respective cleat towards the mounted position of the clip.

Typically, a draper cleat comprises a rubber or rubber-like material which has a high coefficient of friction as preferred in the field of drapers, and thus a bare cleat generates substantial friction upon contact with a support member (part of the header frame) which is disposed beneath the lower run for confining the lower run of the belt to a location above at least one of the forwardly extending arms and above a bottom of the cutter bar, thereby causing the cleat to wear. (The support member ensures a front edge of the belt is clear of both the forwardly extending beam and the cutter bar.)

The clip therefore provides a simple cost-effective device which may be installed on the draper cleat at any time and which is usable to reduce wear thereof when the cleat comes into contact with the support member.

If and when the clip wears out over time, the clip may be replaced without having to repair or replace either one of the cleats and the belt of the draper assembly.

Furthermore, the clip may be installed to cover only the portion of the draper which contacts the support member.

Preferably an outer surface of the channel comprises non-metallic material arranged so as to have a coefficient of friction which is less than that of the cleats. This outer surface is that at the crown and may comprise at least upper portions of the legs.

The use of non-metallic material prevents sparking upon contact of the clip with the lower support member of the draper assembly which typically comprises metallic material.

Typically, the non-metallic material of the channel outer surface is plastic.

The channel may be wholly formed from the plastic so as to reduce cost of manufacturing the clip.

Preferably the material(s) forming the crown, the legs and the connection of the legs relative to the crown is sufficiently stiff and rigid to penetrate the teeth into the side surfaces of the respective cleat solely by downward pressing of the clip onto the respective cleat towards the mounted position of the clip. The clips are thus adapted to be press-fit onto the respective cleats without any further manipulation of the clip being required to retain the clips on the cleats.

In some embodiments, the material the forming the crown, the legs and the connection of the legs relative to the crown, is somewhat resilient so that engagement of the ramped surfaces of the teeth downwardly along the side surfaces of the cleat as the clip is pressed downwardly onto the cleat causes the legs to be flexed outwardly somewhat. In this instance, the material has sufficient bias to return to an unflexed and uninstalled condition to penetrate the teeth into the side surfaces of the cleat once the clip has reached the mounted position with the crown at the top side of the cleat.

In further embodiments, the material the forming the crown, the legs and the connection of the legs relative to the crown, is much more rigid so that engagement of the ramped surfaces of the teeth downwardly along the side surfaces of the cleat as the clip is pressed downwardly onto the cleat causes the resilient material forming the side surfaces of the cleat to undergo more deformation than the outward flexing of the legs of the clip. Again, the material has sufficient bias to remain substantially fixed in an unflexed and uninstalled condition to penetrate the teeth into the side surfaces of the cleat once the clip has reached the mounted position with the crown at the top side of the cleat.

More typically, the material the forming the crown, the legs and the connection of the legs relative to the crown, has material properties arranged so that engagement of the ramped surfaces of the teeth downwardly along the side surfaces of the cleat as the clip is pressed downwardly onto the cleat causes both (i) some deformation of the side surfaces of the cleat about the teeth and (ii) some outward flexing of the legs of the clip.

In either embodiment, the clip is arranged such that in the installed condition, the legs are biased inwardly towards a shape of an unstressed and uninstalled condition by the stiffness and resiliency of the material, which in turn biases the legs inwards towards the side surfaces of the cleat for biting the teeth into the side surfaces of the cleat. The clip is thus arranged to generate sufficient clamping force without substantial manipulation of the clip from an uninstalled condition to an installed condition to be retained on the cleat, that is for example without manually bending the legs inwardly.

The ramped surfaces may oriented at an angle of greater than 45 degrees from an inner surface of the crown to assist in press-fitting the clips onto the cleats. This corresponds to the ramped surfaces being oriented at less than 45 degrees from a plane that is longitudinal of the channel and normal to the inner surface of the crown.

Each tooth may also include an inner surface opposite the ramped surface thereof which extends inwardly towards the opposite one of the legs at an upward slope towards the crown up to the inner free end of the respective tooth. In this instance the inner surface and the outer surface of each tooth may intersect one another at an apex extending longitudinally of the channel at the inner free end of the tooth such that the tooth acts as a barb to resist removal of the clip from the cleat.

Preferably each leg supports a plurality of the teeth thereon at longitudinally spaced positions thereon. In this instance, the teeth may be spaced each from the next by a distance less than half a length of the respective tooth longitudinal of the channel.

In one arrangement an outer surface of the clip is rounded where the respective leg meets the crown such that the outer surface is devoid of any sharp angles which can become caught on any other components of the header as the draper is operated.

In one arrangement, the crown includes a central portion and a pair of end portions extending longitudinally outward from the central portion towards the first and second ends respectively, in which a thickness of the crown within each end portion being tapered longitudinally from the central portion of the crown towards the respective end of the channel such that an overall height of the crown relative to the legs is reduced towards both of the first and second ends of the channel.

When the channel includes a central portion and a pair of end portions extending longitudinally outward from the central portion towards the first and second ends respectively, a width of the clip within each end portion may also be tapered longitudinally from the central portion of the crown towards the respective end of the channel such that the width at the first and second ends is smaller in than the width at the central portion. In this instance, a thickness of each leg of the clip may also be reduced in thickness longitudinally towards the ends of the clip. Preferably the teeth are spaced longitudinally inward relative to the first and second ends of the channel in this instance such that there is a length of the end portion at both ends of the clip where there is no tooth.

According to another aspect of the invention there is provided a crop header arranged for cutting and transporting a standing crop comprising:

a header frame;

the header frame comprising a main rear frame member and a plurality of forwardly extending beams each supported by the main rear frame member;

an elongate cutter bar connected to the forward end of the beams so as to be arranged along a front edge of the frame;

a draper assembly mounted on the header frame rearwardly of the cutter bar such that cut crop falls onto the draper assembly for transportation longitudinally of the header;

the draper assembly including a first and a second draper guide roller each arranged at a respective end of the draper assembly spaced apart along the cutter bar with an axis of each guide roller arranged substantially at right angles to the cutter bar;

wherein the draper assembly comprises a continuous belt of flexible material wrapped about the first and second draper guide rollers so as to define an upper run of the belt on top of the rollers and a lower run of the belt below the rollers;

at least one of the guide rollers being driven to drive the belt;

at least one support member carried below the lower run of the belt extending longitudinally of the lower run with an upper surface of said at least one support member for confining the lower run of the belt to a location above at least one of the forwardly extending beams and a bottom of the cutter bar;

wherein the draper assembly includes a plurality of cleats on the belt each extending transversely of the belt and located at a spaced position from the next longitudinally of the belt;

the respective cleat having a top surface spaced from an outer surface of the belt arranged to carry the cut crop thereon;

the cleats comprising polymeric material with a coefficient of friction;

and a clip mounted on one or more of the cleats;

the clip covering a portion of the top surface of the said at least one of the cleats where the top surface is otherwise in contact with an upper surface of said at least one support member; and the clip having an outer surface of non-metallic material with a lower coefficient of friction than that of said one of more of the cleats so as to reduce friction upon contact with said at least one support member.

As such, the clip is positioned on the respective cleat at a location closer to a front edge than to a rear edge of the lower run.

Further, typically the clip is positioned at a location spaced rearwardly of a front edge of the belt adjacent the cutter bar.

Typically, the clip is an accessory to the draper assembly which is installable onto the cleat.

The clip preferably comprises a channel having an interior profile matching an exterior profile of the respective cleat. More particularly, the clip may fully span over the exterior profile of the respective cleat such that the clip extends from the outer surface of the belt at one side of the cleat to the outer surface of the belt on the other side of the cleat.

In one arrangement, the clip comprises a channel having (i) a crown extending longitudinally between first and second ends at a top side of the channel so as to be located adjacent the top surface of the respective cleat, (ii) legs depending downwardly from opposing sides of the crown, and (iii) a plurality of teeth supported on the legs at a location spaced downwardly from the crown and extending inwardly towards an opposite one of the legs to respective inner free ends of the teeth which bite into the side surfaces of the respective cleat to retain the clip on the respective cleat in a mounted position of the clip. In this instance, each tooth preferably has a ramped surface opposite from the crown which extends inwardly towards the opposite one of the legs at an upward slope towards the crown up to the inner free end of the respective tooth.

Regardless of the user of ramped surfaces, the stiffness of the legs relative to the crown, and the strength of the teeth are arranged such that the clip is adapted to be press-fit onto the respective cleat.

Preferably the outer surface of the clip comprises non-metallic material. Typically, this non-metallic material is plastic.

Generally speaking, the clip may be that as described above in relation to an earlier aspect of the invention.

According to a further aspect of the present invention there is provided a method of installing a clip on a draper of a crop header, the method comprising:

providing the draper with (i) a continuous belt of flexible material arranged to define an upper run and a lower run and having an outer surface of the belt for carrying cut crop thereon, and (ii) a plurality of cleats supported on the belt each having a top surface spaced from the outer surface of the belt and side surfaces depending from the top surface to the outer surface of the belt;

providing the clip with (i) a channel having a crown extending longitudinally between first and second ends at a top side of the channel, (ii) legs depending downwardly from opposing sides of the crown, and (iii) plurality of teeth supported on the legs at a location spaced downwardly from the crown and extending inwardly towards an opposite one of the legs to respective inner free ends of the teeth;

and pressing the clip downwardly onto the cleat such that the inner free ends ride along the side surfaces of the respective cleat as the clip is pressed downwardly onto the respective cleat until the crown of the channel is located at or adjacent the top surface of the respective cleat and the teeth bite into the side surfaces of respective cleat to retain the clip on the respective cleat in a mounted position of the clip.

When each tooth further comprises a ramped surface opposite from the crown which extends inwardly towards the opposite one of the legs at an upward slope towards the crown up to the inner free end of the respective tooth and wherein the method may further include resiliently deforming at least one of (i) the side surfaces of the respective cleat or (ii) the legs of the clip relative to the crown of the clip, as the ramped surfaces of the teeth ride along the side surfaces of the respective cleat during downward pressing of the clip onto the respective cleat.

It will be appreciated that any use herein of "draper canvas" is to be understood as a traditional term based upon the canvas material from which the "draper" was made but that this term no longer provides any indication of nor limitation to the use of particular materials for the base fabric from which the "draper" is made. Many synthetic materials can thus be used. Commonly the draper is coated with a rubber layer and again many different resilient coating materials can be used and no limitation is intended herein in this regard. As in known arrangements, for example in that described in U.S. Pat. No. 5,459,986 (Talbot et al.) issued Oct. 24, 1995 and assigned to the present Assignee, the increased thickness at the edge portion can be made of the same material as the remaining rubber covering or may be a strip of a different material of different chemical structure or of different characteristics.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

The following description relates only those parts of the header which are of importance to the present invention and the remaining parts of the header including the frame structure, drives, ground wheels and the like are omitted as these will be well known to one skilled in the art.

Figure 1:
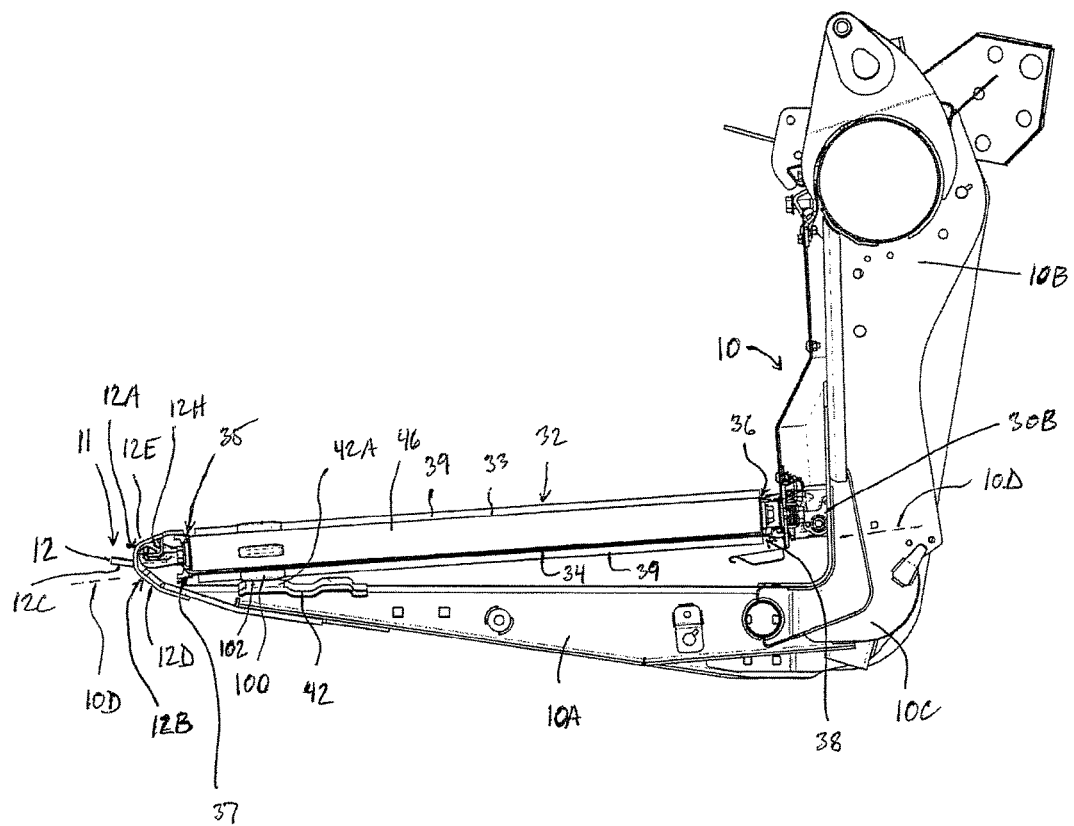
FIG. 1 is a side elevational view of crop header including a draper assembly and a clip according to the present invention.

The header therefore comprises a frame 10, one element 10A of which is in the form of a beam extending horizontally and forwardly from a rear support frame structure 10B to a cutter bar assembly generally indicated at 11 for support of that cutter bar assembly across the front of the header. The plurality of beams 10A are arranged at spaced positions along the length of the header frame so as to support the cutter bar assembly 11 as an elongate structure across the front edge of the header. As shown in FIG. 1, the beams 10A are attached rigidly, that is by a rigid connection 10C, to the main rear frame structure 10B to hold the cutter bar 11 in a fixed common plane 10D. That is the rigid connection holds each of the beams at a fixed angle relative to the main rear frame member so as to extend forwardly therefrom to a forward end.

The cutter bar comprises a generally Y-shaped beam 12 with a leg 12C and two arms 12D and 12E. The beam is formed from two components 12A and 12B welded together at the leg 12C, where the leg provides structural support for the cutter bar elements including the guards and sickle bar which are omitted from the drawings. The knife guards are of course of well-known construction and carry a sickle knife assembly having a longitudinally reciprocating bar driving a plurality of triangular knife blades which sit on the knife guards and reciprocate back and forth across the knife guards in a cutting action.

The leg 12E of the cutter bar support beam 12 includes a front wall portion extending upwardly and rearwardly from the flange 12C to an upper generally rearwardly extending top wall which extends to a rear apex. At the apex the top wall connects with an L-shaped hanger portion 12H including a vertical extending plate and a forwardly extending generally horizontal flange projecting toward but not meeting the front wall portion.

The leg 12D forms a rearwardly and downwardly extending wall which acts as a skid plate when the cutter bar is cutting on the ground. The plate may be covered by a protective plastics wear shield (not shown).

Figure 2:
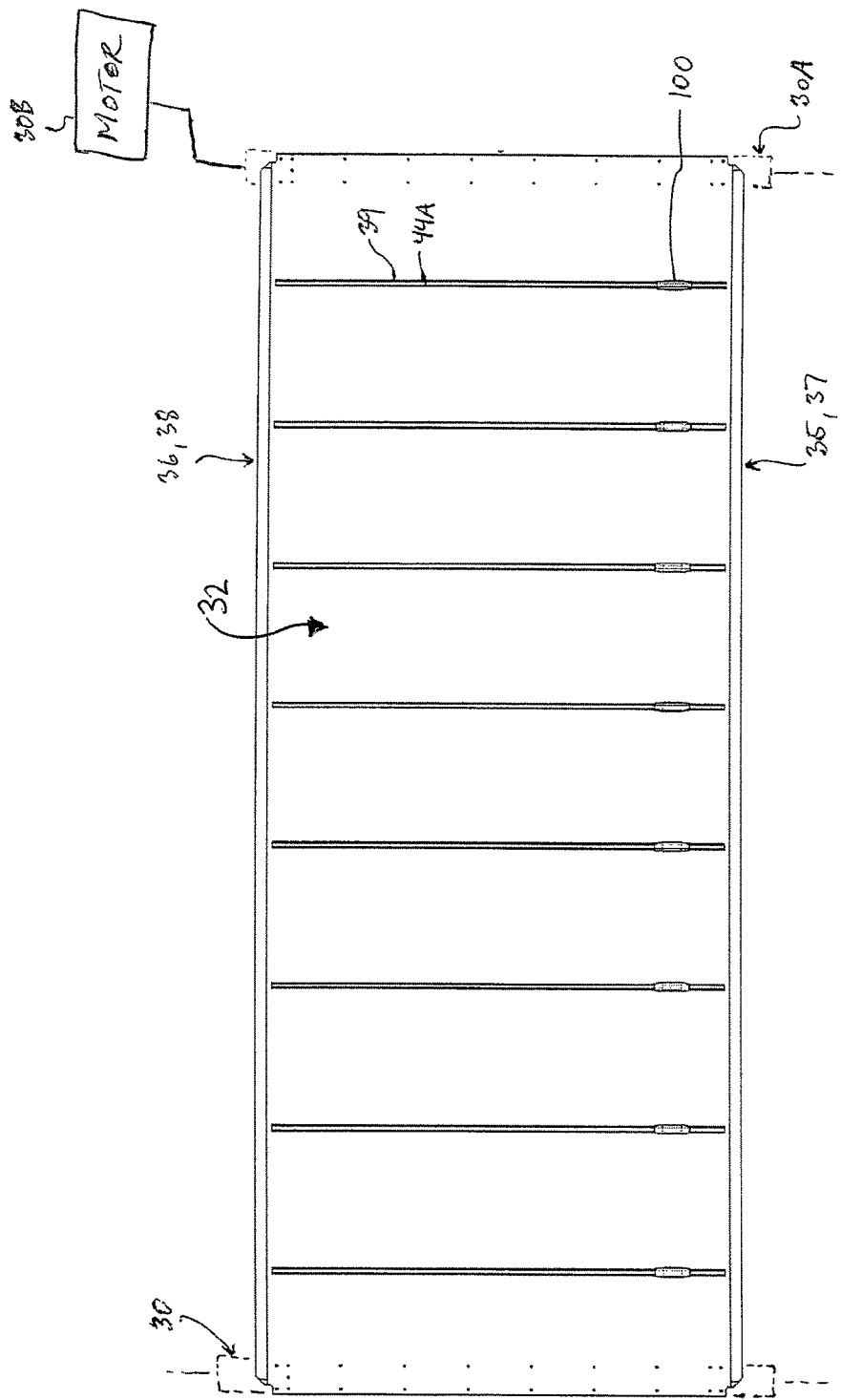
FIG. 2 is a top plan view of the draper assembly with the clip.
Figure 3:
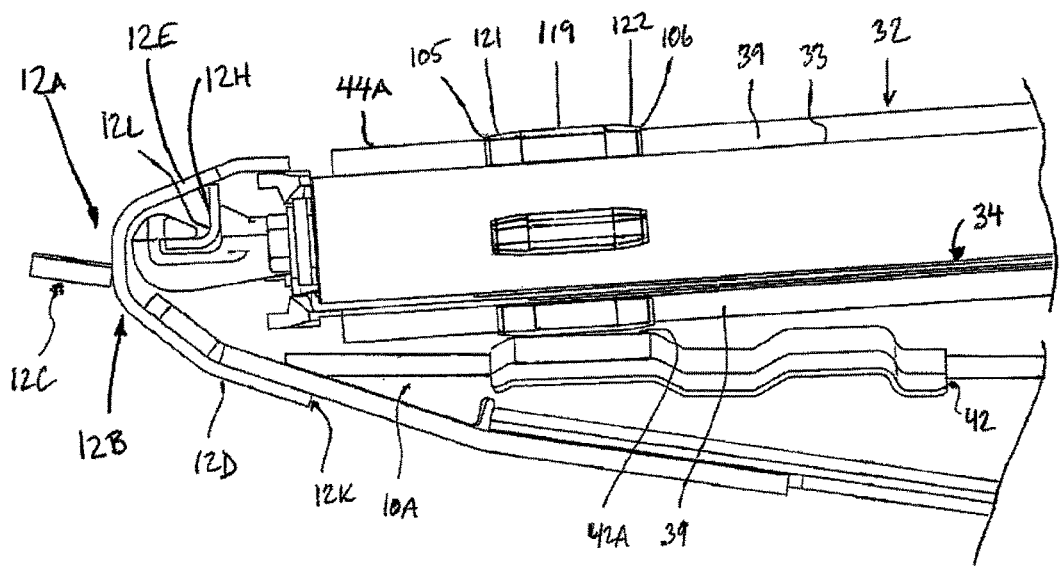
FIG. 3 illustrates an enlarged view of a forward section of the crop header of FIG. 1 in the vicinity of the cutter bar.
Figure 4:
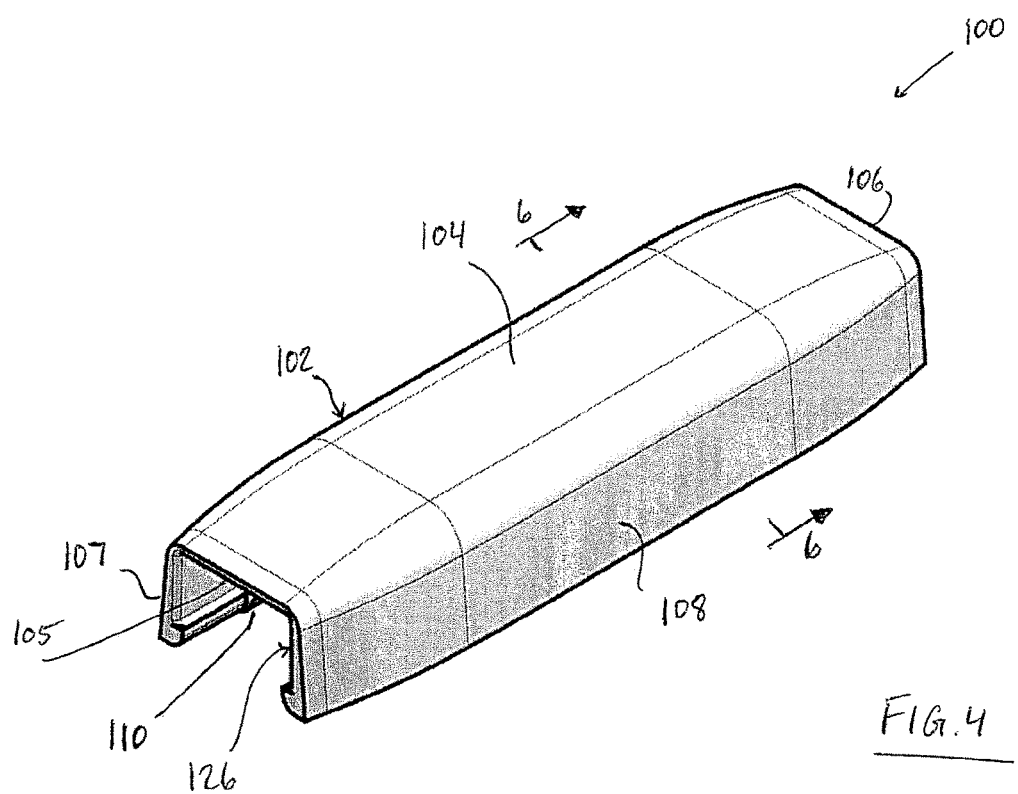
FIG. 4 is a first perspective view of a first embodiment of the clip showing a top side of the clip.
Figure 5:
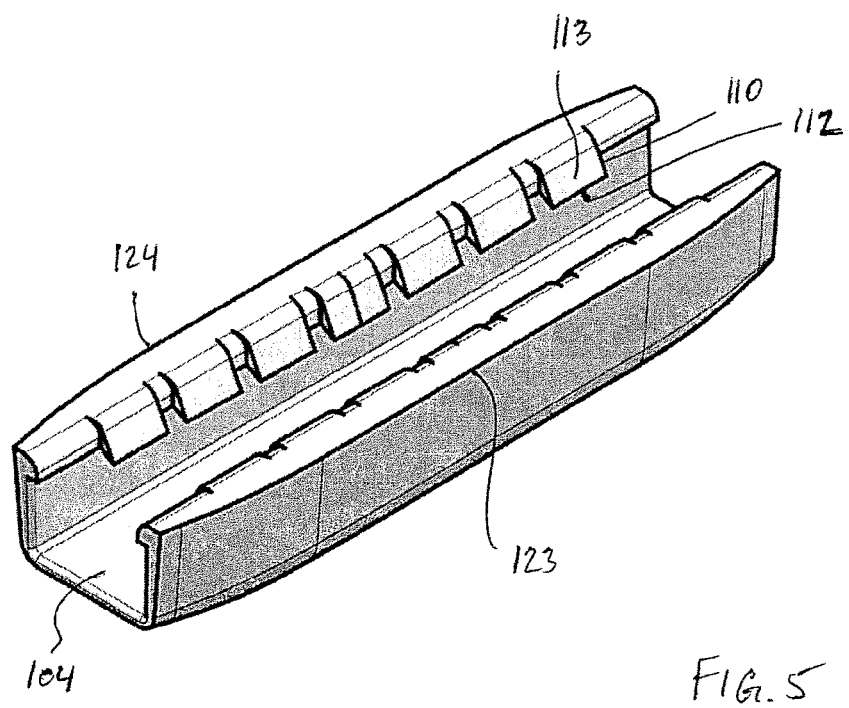
FIG. 5 is a second perspective view of the clip showing a bottom side of the clip according to the first embodiment of FIG. 4.
Figure 6:
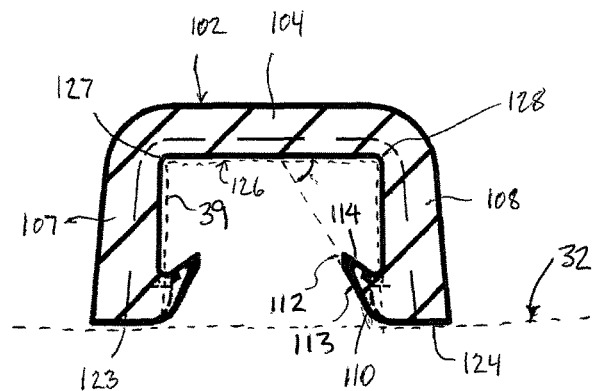
FIG. 6 is a transverse cross-sectional view of the clip along line 6-6 in FIG. 4 of the clip according to the first embodiment of FIG. 4 in which the outer surface of the draper including the exterior profile of the cleat are shown in broken line.
Figure 7:
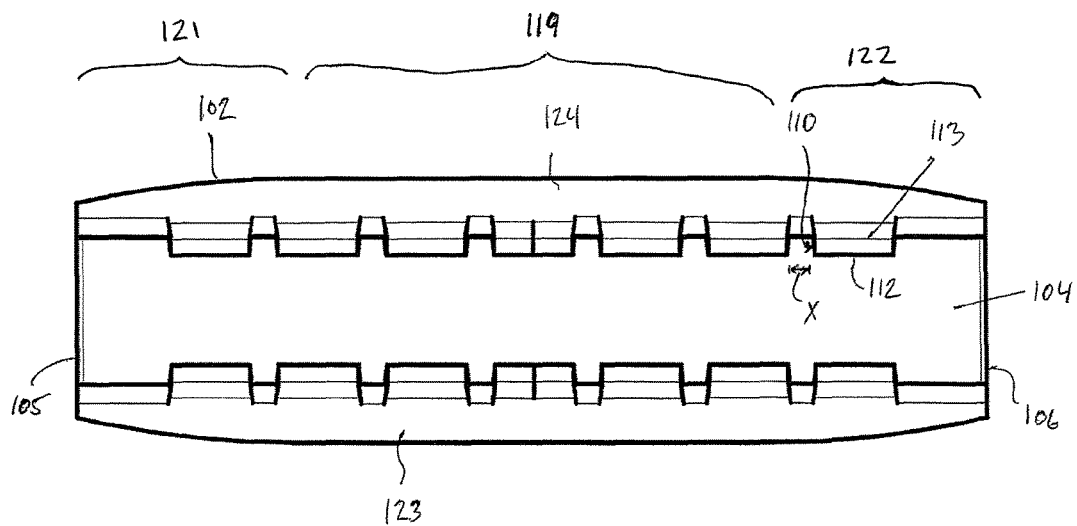
FIG. 7 is bottom view of the clip according to the first embodiment of FIG. 4.

The draper assembly, best shown in FIG. 2, includes a first draper support roller 30 and a second draper support roller 30A. One of these rollers is driven by a drive motor 30B to effect rotation of the draper in conventional manner. The draper assembly further includes a draper 32 in the form of a continuous loop or band of fabric which is wrapped about the rollers at respective ends to form an upper run 33 of the draper on top of the rollers and a lower run 34 of the draper underneath the rollers. The rollers are thus spaced longitudinally of the cutter bar and arranged with their axes of rotation parallel and at right angles to the lateral direction that the cutter bar extends along the front edge of the header frame. The draper thus includes a front edge 35 of the upper run which is adjacent the cutter bar and a rear edge 36 of the upper run 33 which is remote from the cutter bar and spaced rearwardly therefrom thus defining therebetween a flat surface of the upper run for transportation of the crop longitudinally of the header. The lower run 34 also includes a front edge 37 and a rear edge 38. The draper includes a plurality of conventional transverse cleats 39 which assist in carrying the crop along the draper extending transversely of the draper and at spaced positions longitudinally thereof. Each edge of the draper can include a conventional folded seam so as to define a portion of the draper material which is folded back with that folded back portion being folded back on top of the fabric layer and bonded to the draper by the vulcanization effect in the manufacture of the draper.

The front edge portion 35 of the draper may include an optional thickened layer of rubber 35A so that a flat underside of the sealing member's second flexible portion runs along an upper surface of the thickened layer of rubber as the upper run of the draper moves longitudinally of the cutter bar 12. The thickened layer of rubber if used can provide a dam for dirt trickling forwardly down the draper so that it is blocked and carried to the end without reaching the seal.

In order to maintain the lower run 34 at a location where it is clear of the cutter bar and the beams 10A over which it passes, a lower support track 42 in the form of a corrugated plate is provided supported beneath the lower run on the beams 10A extending longitudinally of the lower run 34 in a position closer to the front edge 37 than to the rear edge 38 of the lower run. The lower support track is thus located above the beams 10A (as it rests thereon) and a bottom 12K of the cutter bar that is defined at the lower leg 12D.

Conventionally, an upper surface 42A of the lower support track is arranged to contact a bare top surface 44A of the respective cleat 39 when that cleat moves from position at the upper run to the lower run 34 as the top surface 44A is spaced outwardly from an outer surface 46 of the draper on which the cut crop lies as it is carried by the draper. It is through this contact with the lower support track that the front edge 37 of the lower run is maintained above both the bottom of the cutter bar and the lower run 34 above the beams 10A thereunder. However, disadvantageously the cleat experiences significant wear due to friction with the lower support track.

Thus, a clip 100 is provided at one or more of the cleats (typically all of them) covering that portion of the top surface 44A of the respective cleat positioned in a prescribed position so as to be otherwise in contact with the upper surface 42A of the lower support track. The clip comprises an outer surface 102 with a lower coefficient of friction than that of the cleat, which is the primary contributor to the friction at an interface of the cleats at the lower run and the lower support track due to the rubber composition of surfaces of the cleat, so as to reduce the friction upon contact with the lower support track.

Although two embodiments of the clip are illustrated and described herein, the two embodiments differ only in the overall profile and/or shape thereof so as to be adapted to two different shapes of cleats on different types of drapers. The function of the clip and the manner in which the clip interacts with the cleat upon which it is mounted is substantially identical in both embodiments. The following description is directed towards the common features of the two embodiments.

As such, the clip 100 is positioned in the prescribed position on the respective cleat 39 at a location closer to the front edge 37 than to the rear edge 38 of the lower run 34 and spaced rearwardly from the front edge 37, so as to be aligned with the lower support track transversely of the draper lower run.

The clip 100 is an accessory installed on the respective cleat such that the clip is wholly distinct therefrom. Thus when the clip wears out with use, the clip alone may be replaced without need to replace any part of the draper due to the friction occurring at the interface between the draper and the lower support track.

As shown more clearly in FIGS. 4-10, the clip forms a channel receiving the cleat with a crown 104 at a top side of the channel extending longitudinally from a first end 105A to a second end 106 of the channel and legs 107, 108 depending downwardly from opposing sides of the crown. Thus, the crown is locatable at or adjacent the top surface 44A of the cleat, though typically in abutment with the cleat top surface as better shown in FIG. 10, and the legs 107, 108 are locatable at or adjacent side surfaces 44C and 44D of the cleat that depend from the cleat top surface 44A to the outer surface 46 of the draper.

The clip further includes a plurality of teeth 110 supported at insides of each of the legs 107, 108 at a location spaced downwardly from the crown for gripping the respective cleat at its side surfaces 44C, 44D. The teeth 110 are positioned at bottoms of the legs and each tooth is spaced longitudinally from the next by a distance X less than half the width of the respective tooth longitudinally of the channel. The teeth forming ends of the series of the teeth on each leg are also spaced longitudinally inward from the first and the second ends 105, 106 of the channel such that there is a length of the leg at both longitudinally opposed ends thereof where there is no tooth.

The teeth 110 are maintained in fixed relation to the legs of the channel and are oriented so as to extend inwardly towards an opposite one of the legs to an inner free end 112 of the respective tooth. More particularly, each tooth includes a ramped surface 113 at an outer side facing generally downwardly and away from the crown and an opposite inner surface 114 facing generally upwardly towards the crown. The ramped surface 113 and the inner surface 114 meet at an apex having an interior angle of less than 45 degrees to form a sharp edge extending longitudinally of the channel at the inner free end 112 of the tooth.

The outer ramped surfaces 113 of the teeth extend inwardly towards the other leg of the channel at an upward slope from the bottoms of the legs up to the inner free ends. The teeth are oriented so that a plane extending from the teeth along the ramped surfaces thereof to the crown forms an angle with the crown that is greater than 45 degrees, such that the teeth are inclined closer to the vertical than to the horizontal. This corresponds to the ramped surfaces being less than 45 in relation to a vertical plane that is both longitudinal of the channel and perpendicular to the inner surface of the crown. The ramped surfaces are thus transverse and sloped at a greater angle to the vertical plane than the side surfaces of the cleat so as to be adapted to ride along the side surfaces of the respective cleat as the clip is pressed downwardly onto the respective cleat towards the mounted position of the clip.

The inner surface 114 of each tooth which is opposite the ramped surface thereof, also extends inwardly towards the opposite one of the legs at an upward slope towards the crown up to the inner free end of the respective tooth. The inner surface 114 and the outer surface 113 of each tooth thus intersect one another at an apex extending longitudinally of the channel at the inner free end of the tooth having an interior angle which is less than 45 degrees to function of as a barb which is readily penetrated into the side surfaces of the cleat if the clip is pulled upwardly away from the outer surface of the draper. The shape of the teeth is thus adapted so that the outer ramped surfaces 113 are slidable along the side surfaces 44C, 44D of the respective cleat during installation of the clip, but when the clip is in an installed condition the inner free ends of the teeth bite into the side surfaces so as to be retained on the respective cleat.

The legs 107, 108 of the channel are substantially rigid and fixed in relation to the crown 104. Therefore, with the teeth 110 arranged as they are, the cleat may be pressed onto the cleat by hammering of the clip downward into the prescribed position. As the clip is pressed downwardly onto the cleat, the inner free ends ride along the side surfaces of the respective cleat until the crown of the channel is located at or adjacent the top surface of the respective cleat and the bottom ends of the legs are adjacent the outer surface of the draper. During downward pressing of the installation, at least one or both of (i) the side surfaces of the respective cleat, and/or (ii) the legs of the clip relative to the crown of the clip, are resiliently deformed as the ramped surfaces of the teeth ride along the side surfaces of the respective cleat towards the mounted position of the clip.

Due to the stiffness of the material forming the clip, the clip is arranged to generate sufficient clamping force by biasing of the legs inwardly towards the side surfaces of the cleat in the installed condition of the clip, by the clip being biased to remain or return to an unflexed, uninstalled condition of the clip.

To guide the clamping force of the teeth biting into the cleat, an interior cross-section or interior profile of the channel is shaped so as to match an exterior cross-section or exterior profile of the respective cleat. More particularly, the clip fully spans over the exterior profile of the cleat such that the clip extends from the outer surface of the belt at one side of the cleat to the outer surface of the belt on the other side of the cleat.

Although there may be some slight resilient bending at a joint of the respective leg with the crown upon installation onto the cleat prior to biting of the teeth into the sides thereof, due to the substantially fixed and rigid orientation of the legs of the channel in relation to the crown, together with the matching profiles of the clip and cleat, the clip is able to provide on its own the clamping force required to effect biting of the teeth into the cleat.

In the illustrated arrangements, the teeth are rectangular in shape such that the free ends are defined by edges 112 extending longitudinally of the channel.

The outer surface 102 of the clip comprises plastic material particularly at the crown 104 that is arranged so as to have a coefficient of friction which is less than that of the cleats. The use of non-metallic material, as with the plastic, prevents sparking upon contact of the clip with the lower support track which typically comprises metallic material. Also, the outer surface at upper portions of the legs 107, 108 near where these legs meet the crown may comprise the plastic material. The outer surface 102 of the clip is shaped to be rounded where the legs meet the crown longitudinally along the full length thereof to further minimize any frictional resistance as the outer surface of the clip rides over the upper surface of the lower support member 42.

The channel is also shaped to include a central portion 119 and a pair of end portions 121 and 122 extending longitudinally outward from the central portion towards the first and second ends respectively. The clip is shaped such that a thickness of the crown within each end portion is tapered longitudinally from the central portion of the crown towards the respective end of the channel such that an overall height of the crown relative to the legs is reduced towards both of the first and second ends of the channel. Thus, the crown has end portions 121 and 122 where the outer surface of the clip lies transversely at a slope relative to the outer surface at the central portion 119 of the clip.

Furthermore, a width of the clip (in a lateral direction perpendicular to the longitudinal direction of the channel) within each end portion is tapered longitudinally from the central portion of the crown towards the respective end 105/106 of the channel such that the width at the first and second ends is smaller in than the width at the central portion. This corresponds to a thickness of the legs being reduced towards both ends of the channel.

Figure 8:
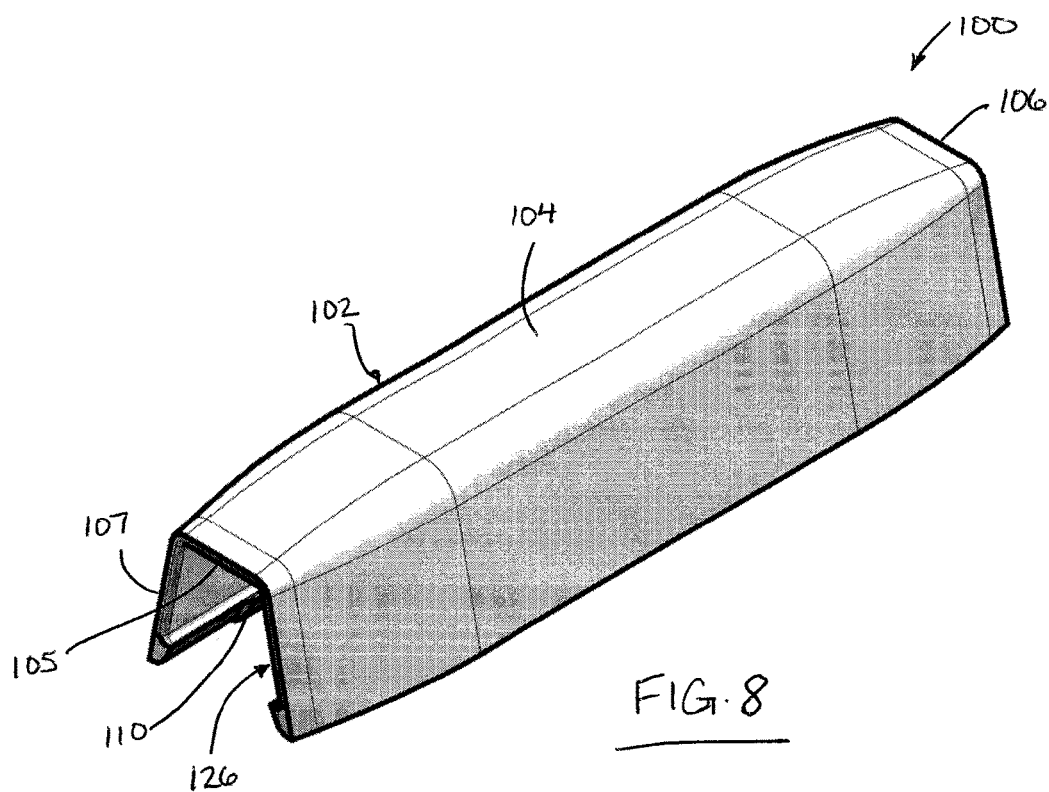
FIG. 8 is a first perspective view of a second embodiment of the clip showing a top side of the clip.
Figure 9:
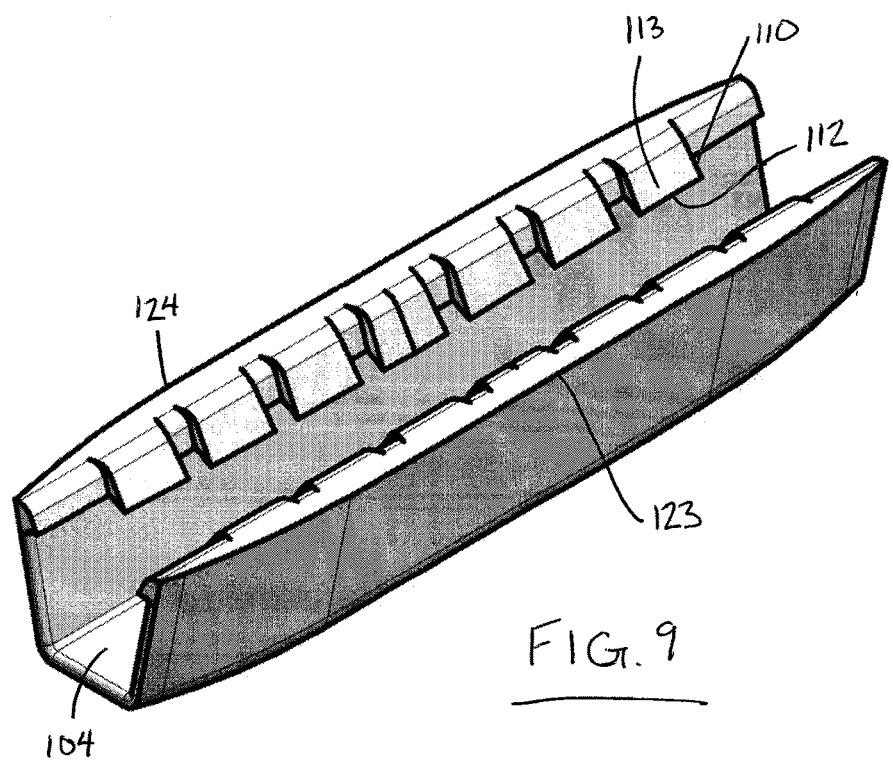
FIG. 9 is a second perspective view of the clip showing a bottom side of the clip according to the second embodiment of FIG. 8.
Figure 10:
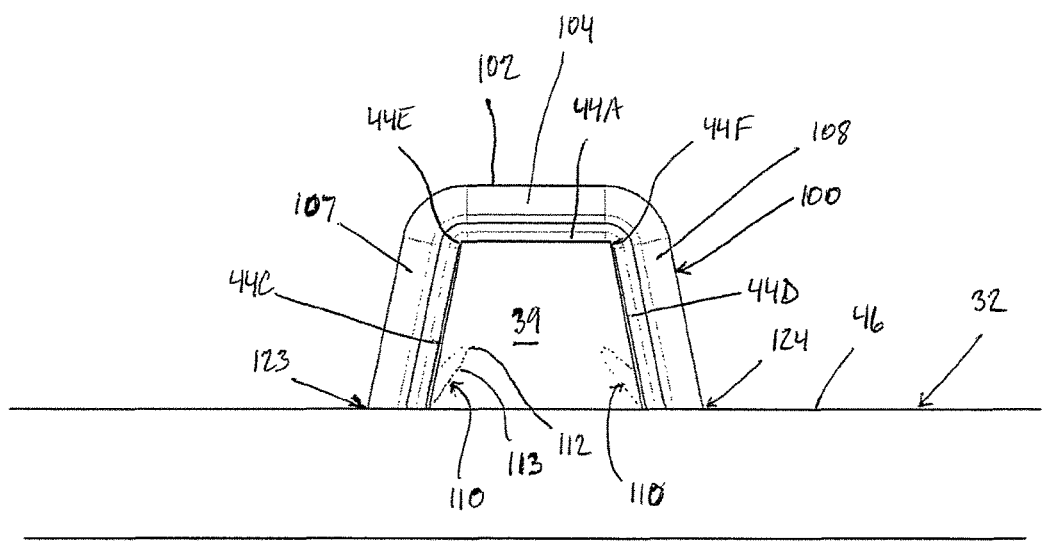
FIG. 10 is an end elevational view of the draper assembly showing the clip according to the second embodiment of FIG. 8, where some components are omitted for clarity of illustration.

In the installed condition of the clip which is more clearly shown in FIG. 8, the clip wraps about edges 44E and 44F of the top surface 44A of the respective cleat such that bottoms 123, 124 of the clip remote from the crown 104 are located at the side surfaces 44C, 44D of the cleat. As the clip's interior transverse cross-section conforms to the exterior transverse cross-section of the cleat, an inside surface 126 of the clip at the crown 104 abuts the cleat top surface 44A, and the inside surface at the legs abuts the side surfaces 44C and 44D. Fittingly, the edges 44E, 44F which extend longitudinally of the cleat and at which the side surfaces 44C, 44D are contiguous with the top surface are nested at shoulders 127, 128 of the clip where the crown is contiguous with the legs. Moreover, the clip with interior transverse cross-section which is sized to match the exterior transverse cross-section of the cleat allows for the clip bottoms 123, 124 to touch the outer surface 46 of the draper, such that a whole of the cleat at the prescribed position of the clip is covered thereby. In FIG. 10 the teeth 110 are shown in broken line to generally illustrate their position relative to the cleat in the installed condition of the clip.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A crop harvesting header comprising:
a header frame;
an elongate cutter bar extending in a lateral direction along a front edge of the header frame, the cutter bar being operable to cut a standing crop as the header frame is displaced forwardly across ground carrying the standing crop;
a draper assembly mounted on the header frame rearwardly of the cutter bar to receive the crop cut by the cutter bar, the draper assembly comprising:
(i) a first and a second draper guide roller each arranged at a respective end of the draper assembly spaced apart along the cutter bar with an axis of each guide roller arranged substantially at right angles to the lateral direction of the cutter bar;
(ii) a continuous belt of flexible material wrapped about the first and second draper guide rollers, the continuous belt including an upper run of the belt on top of the rollers and a lower run of the belt below the rollers;
(iii) a drive motor coupled to at least one of the guide rollers by which the belt is driven to rotate about the guide rollers to transport the cut crop in the lateral direction along the header frame; and
(iv) a plurality of cleats on the belt each extending transversely of the belt, the cleats being spaced apart from one another longitudinally of the belt, each cleat having a top surface spaced from an outer surface of the belt and side surfaces depending from the top surface to the outer surface of the belt; and
a clip mounted on one or more of the cleats, the clip comprising:
a channel having a crown extending longitudinally between first and second ends at a top side of the channel that is adjacent the top surface of the respective cleat and legs depending downwardly from opposing sides of the crown such that the legs extend along the side surfaces of the cleat respectively towards the belt; and
a plurality of teeth, each tooth being supported on one of the legs at a location spaced downwardly from the crown and extending inwardly towards an opposite one of the legs to a respective inner free end of the tooth;
the inner free end of each tooth being penetrated into the respective side surface of the respective cleat by which the clip is retained on the respective cleat in a mounted position of the clip;
each tooth having a ramped surface opposite from the crown which extends inwardly towards the opposite one of the legs at an upward slope towards the crown up to the inner free end of the respective tooth.

2. The clip according to claim 1 wherein an outer surface of the channel comprises non-metallic material arranged so as to have a coefficient of friction which is less than that of the cleats.

3. The crop header according to claim 1 wherein the legs are sufficiently rigid relative to the crown to penetrate the teeth into the side surfaces of the respective cleat solely by downward pressing of the clip onto the respective cleat towards the mounted position of the clip.

4. The crop header according to claim 1 wherein the ramped surfaces are oriented at an angle of greater than 45 degrees from an inner surface of the crown.

5. The crop header according to claim 1 wherein each tooth includes an inner surface opposite the ramped surface thereof which extends inwardly towards the opposite one of the legs at an upward slope towards the crown up to the inner free end of the respective tooth, the inner surface and the outer surface of each tooth intersecting one another at an apex extending longitudinally of the channel at the inner free end of the tooth.

6. The crop header according to claim 1 wherein each leg supports a plurality of the teeth thereon at longitudinally spaced positions thereon.

7. The clip according to claim 6 wherein the teeth are spaced each from the next by a distance less than half a length of the respective tooth longitudinal of the channel.

8. The crop header according to claim 1 wherein an outer surface of the clip is rounded where the respective leg meets the crown.

9. A clip for use in a crop header which includes draper with (i) a continuous belt of flexible material arranged to define an upper run and a lower run and having an outer surface of the belt for carrying cut crop thereon, and (ii) a plurality of cleats supported on the belt each having a top surface spaced from the outer surface of the belt and side surfaces depending from the top surface to the outer surface of the belt, the clip comprising:
   a channel having a crown extending longitudinally between first and second ends at a top side of the channel that is locatable at or adjacent the top surface of the respective cleat and legs depending downwardly from opposing sides of the crown; and
   a plurality of teeth supported on the legs at a location spaced downwardly from the crown and extending inwardly towards an opposite one of the legs to a respective inner free ends of the teeth which are adapted for biting into the side surfaces of the respective cleat to retain the clip on the respective cleat in a mounted position of the clip;
   each tooth having a ramped surface opposite from the crown which extends inwardly towards the opposite one of the legs at an upward slope towards the crown up to the inner free end of the respective tooth such that the ramped surface of each tooth is adapted to ride along the side surfaces of the respective cleat as the clip is pressed downwardly onto the respective cleat towards the mounted position of the clip;
   wherein the crown includes a central portion and a pair of end portions extending longitudinally outward from the central portion towards the first and second ends respectively, a thickness of the crown within each end portion being tapered longitudinally from the central portion of the crown towards the respective end of the channel such that an overall height of the crown relative to the legs is reduced towards both of the first and second ends of the channel.

10. A clip for use in a crop header which includes draper with (i) a continuous belt of flexible material arranged to define an upper run and a lower run and having an outer surface of the belt for carrying cut crop thereon, and (ii) a plurality of cleats supported on the belt each having a top surface spaced from the outer surface of the belt and side surfaces depending from the top surface to the outer surface of the belt, the clip comprising:
   a channel having a crown extending longitudinally between first and second ends at a top side of the channel that is locatable at or adjacent the top surface of the respective cleat and legs depending downwardly from opposing sides of the crown; and
   a plurality of teeth supported on the legs at a location spaced downwardly from the crown and extending inwardly towards an opposite one of the legs to a respective inner free ends of the teeth which are adapted for biting into the side surfaces of the respective cleat to retain the clip on the respective cleat in a mounted position of the clip;
   each tooth having a ramped surface opposite from the crown which extends inwardly towards the opposite one of the legs at an upward slope towards the crown up to the inner free end of the respective tooth such that the ramped surface of each tooth is adapted to ride along the side surfaces of the respective cleat as the clip is pressed downwardly onto the respective cleat towards the mounted position of the clip;
   wherein the channel includes a central portion and a pair of end portions extending longitudinally outward from the central portion towards the first and second ends respectively, a width of the clip within each end portion being tapered longitudinally from the central portion of the crown towards the respective end of the channel such that the width at the first and second ends is smaller in than the width at the central portion.

11. The clip according to claim 10 wherein the teeth are spaced longitudinally inward relative to the first and second ends of the channel such that there is a length of the end portion at both ends of the clip where there is no tooth.

12. A method of installing a clip on a draper of a crop header, the method comprising:
   providing the draper with (i) a continuous belt of flexible material arranged to define an upper run and a lower run and having an outer surface of the belt for carrying cut crop thereon, and (ii) a plurality of cleats supported on the belt each having a top surface spaced from the outer surface of the belt and side surfaces depending from the top surface to the outer surface of the belt;
   providing the clip with (i) a channel having a crown extending longitudinally between first and second ends at a top side of the channel, (ii) legs depending downwardly from opposing sides of the crown, and (iii) a plurality of teeth supported on the legs at a location spaced downwardly from the crown and extending inwardly towards an opposite one of the legs to respective inner free ends of the teeth in which each tooth has a ramped surface opposite from the crown which extends inwardly towards the opposite one of the legs at an upward slope towards the crown up to the inner free end of the respective tooth;
   and penetrating the teeth into the side surfaces of the respective cleat to retain the clip on the respective cleat in a mounted position of the clip by pressing the clip downwardly onto the cleat such that the ramped surfaces of the teeth ride along the side surfaces of the respective cleat as the clip is pressed downwardly onto the respective cleat until the crown of the channel is located at or adjacent the top surface of the respective cleat.

13. The method according to claim 12 further comprising resiliently deforming at least one of (i) the side surfaces of the respective cleat or (ii) the legs of the clip relative to the crown of the clip, as the ramped surfaces of the teeth ride along the side surfaces of the respective cleat during downward pressing of the clip onto the respective cleat.

14. A crop harvesting header comprising:
   a header frame;
   the header frame comprising a main rear frame member and a plurality of forwardly extending beams each supported by the main rear frame member;
   an elongate cutter bar connected to the forward end of the beams and extending in a lateral direction along a front edge of the header frame, the cutter bar being operable to cut a standing crop as the header frame is displaced forwardly across ground carrying the standing crop;
   a draper assembly mounted on the header frame rearwardly of the cutter bar to receive the crop cut by the cutter bar the draper assembly comprising:
   (i) a first and a second draper guide roller each arranged at a respective end of the draper assembly spaced apart along the cutter bar with an axis of each guide roller arranged substantially at right angles to the lateral direction of the cutter bar;
   (ii) a continuous belt of flexible material wrapped about the first and second draper guide rollers, the continuous belt including an upper run of the belt on top of the rollers and a lower run of the belt below the rollers;
(iii) a drive motor coupled to at least one of the guide rollers by which the belt is driven to rotate about the guide rollers to transport the cut crop in the lateral direction along the header; and
(iv) a plurality of cleats on the belt each extending transversely of the belt, the cleats being spaced apart from one another longitudinally of the belt, each cleat having a top surface spaced from an outer surface of the belt and side surfaces depending from the top surface to the outer surface of the belt;

at least one support member carried on the header frame to extend in the lateral direction of the cutter bar above at least one of the forwardly extending beams and below the lower run of the belt, an upper surface of said at least one support member far confining the lower run of the belt to a location above said at least one of the forwardly extending beams and a bottom of the cutter bar;

the cleats comprising polymeric material with a coefficient of friction;

and a clip mounted on one or more of the cleats in which the clip covers a portion of the top surface of the cleat that is otherwise in contact with an upper surface of said at least one support member by which the clip engages the upper surface of said at least one support member as the belt is driven to rotate;

the clip having an outer surface of non-metallic material engaging the upper surface of said at least one support member as the belt is driven to rotate, in which the non-metallic material of the outer surface of the clip has a lower coefficient of friction than the polymeric material of said one of more of the cleats.

15. The crop header according to claim 14 wherein the clip comprising a channel having an interior profile matching an exterior profile of the respective cleat.

16. The crop header according to claim 15 wherein the clip fully spans over the exterior profile of the respective cleat such that the clip extends from the outer surface of the belt at one side of the cleat to the outer surface of the belt on the other side of the cleat.

17. The crop header according to claim 14 wherein the clip is adapted to be press-fit onto the respective cleat.

18. The crop header according to claim 14 wherein the clip comprises a channel having (i) a crown extending longitudinally between first and second ends at a top side of the channel so as to be located adjacent the top surface of the respective cleat, (ii) legs depending downwardly from opposing sides of the crown, and (iii) a plurality of teeth supported on the legs at a location spaced downwardly from the crown and extending inwardly towards an opposite one of the legs to respective inner free ends of the teeth which bite into the side surfaces of the respective cleat to retain the clip on the respective cleat in a mounted position of the clip, each tooth having a ramped surface opposite from the crown which extends inwardly towards the opposite one of the legs at an upward slope towards the crown up to the inner free end of the respective tooth.

19. The crop header according to claim 14 wherein the outer surface of the clip comprises plastic material.

20. The crop header according to claim 14 wherein the clip is positioned at a location spaced rearwardly of a front edge of the belt adjacent the cutter bar.

* * * * *